3,530,085
WAX COATING COMPOSITION
James W. Beardmore, Walnut Creek, and Cyril B. Coenen, Concord, Calif., assignors to Shell Oil Company, New York, N.Y., a corporation of Delaware
No Drawing. Filed Feb. 28, 1968, Ser. No. 708,767
Int. Cl. C08c 11/70
U.S. Cl. 260—28.5                                6 Claims

ABSTRACT OF THE DISCLOSURE

Hot melt petroleum wax compositions of improved adhesivity to paper containing a minor proportion of a copolymer polyester of ethylene and an unsaturated ester comonomer, e.g. ethylene-vinyl acetate copolymer or ethylene-methyl acrylate copolymer and 200 p.p.m. to 2000 p.p.m. of an N-(di- or tri-alkoxysilylalkyl)alkylenediamine, e.g., N - (di-methoxymethylsilylisobutyl)ethylenediamine, the polyester and silane compound cooperating to provide the improved adhesivity of the wax composition.

BACKGROUND OF THE INVENTION

Petroleum waxes, both the conventional distillate waxes and the residue waxes, separately and in various combinations or blends have been used for many years for various protective coating purposes. More recently a number of olefin polymers, e.g., polyethylene, polypropylene and ethylenepropylene copolymer and polymeric esters, e.g., ethylene-vinyl acetate copolymers and ethylene-methyl acrylate copolymers have been incorporated in petroleum waxes to provide improvements in various properties while retaining certain advantages of the petroleum waxes. See, for example, U.S. 3,048,551, Aug. 7, 1962, to Robert G. Lutz, on certain petroleum waxes containing minor amounts of both a low density and high density polyalkene of 2 to 3 carbons per alkene unit; Cyril B. Coenen et al. U.S. 3,210,305, Oct. 5, 1965, on petroleum waxes containing certain ethylene-propylene copolymers; Cyril B. Coenen et al. U.S. 3,303,150, Feb. 7, 1967, on petroleum waxes containing both ethylene polymer and ethylene-propylene copolymer; Frederick P. Reding U.S. 2,877,196, Mar. 10, 1959, on petroleum waxes containing ethylene-vinyl acetate copolymers; and Karekin G. Arabian et al. U.S. 3,338,856, Aug. 29, 1967, on certain petroleum wax blends containing copolymers of ethylene and vinyl acetate or of ethylene and an alkyl acrylate, e.g. ethyl or methyl acrylate.

In some instances, because of an incompatibility in certain properties or function, another substance may be used to superficially treat the substrate to which the protective coating is to be applied and then the coating (or laminating) composition, e.g., a petroleum wax or a polyolefin wax-substitute, is then applied as a hot melt to the treated substrate. Adhesives may be thus applied. For example, Lester H. Reinke U.S. 3,046,155, July 24, 1962, discloses the treatment of a paper surface with certain trialkoxysilylalkylpolyaminoalkanes to provide improved bonding to polyethylene films applied as a hot melt.

The various compositions and methods proposed for different coatings and laminating applications still leave unattained objectives in certain uses of the inexpensive petroleum waxes, and certain means utilized in applications of polyolefin coatings are not applicable to the petroleum waxes. Thus, the method disclosed in U.S. 3,046,155 for bonding polyethylene film to paper surfaces is ineffective with petroleum waxes, even with petroleum wax-polyolefin blends.

SUMMARY OF THE INVENTION

It has now been found that petroleum waxes containing a minor proportion of a compatible copolymer of an olefin of 3 to 8 carbon atoms and a mono-ethylenically unsaturated ester of 3 to 8 carbon atoms, being an alkenyl alkanoate or an alkyl alkenoate, and an added amount from about 200 to about 2000 p.p.m., based on the total composition, of an N-(di-, or tri-loweralkoxysilylalkyl) polyaminoalkane, with or without a minor proportion of an ethylene-propylene copolymer, as described in U.S. 3,210,305, to modify the melt-viscosity of the wax, are especially useful as hot melts for applying to surfaces of cellulosic materials, such as paper, with improved adhesion of the resulting cooled solid film to the substrate. Besides an increase in the immediate adhesion, it does not deteriorate with time, neither for the coated single sheet nor when two such coated sheets are sealed together at the wax-air surfaces.

The silane adhesive agent

The silane component of the composition is either a dialkoxy alkyl aminoalkylaminoalkyl silane or a corresponding trialkoxy aminoalkylaminoalkyl silane, the latter being those disclosed in U.S. 3,046,155, supra. The dialkoxy silanes are preferred for incorporation in the waxes of this invention containing the ester group-containing copolymers. The alkoxy groups are preferably alkoxy of 1 to 2 carbon atoms, i.e., methoxy and ethoxy, the alkyl attached directly and only to the silicon is preferably alkyl of 1 or 2 carbons, and the intervening and terminal alkyls of the polyaminoalkyl moiety preferably contain from 2 to 4 carbon atoms each. The polyaminoalkyl moiety attached to the silicon by a C- to Si linkage is preferably an N-alkylethylenediamine or N-alkylpropylenediamine moiety, with one of the amino groups being primary and the other secondary.

The polyester

The polyesters which can be used are the same as those which are disclosed in U.S. 3,338,856. They comprise the Elvax resin type (ethylenevinyl acetate copolymers) and the ethylene-methyl acrylate copolymer type. The unsaturated ester comonomer proportion of the polyester copolymer is from about 15 to about 35% by weight of the copolymer and the unsaturated ester comonomer is preferably a terminally mono-ethylenically unsaturated ester containing a total of 3 to 5 carbon atoms. It appears that the polyesters not only serve their previous purposes, but that they serve to retain the bonding portion of the silane compound in the interfacial layer of the wax while permitting that portion to become chemically bonded to the substrate material. It is not known with any degree of certainty what mechanisms or interactions are involved. However, the ester moieties seem to selectively interact with the secondary amino groups (primary amines alone are not effective), without interfering with the alkoxysilane group and that group interacts with active hydroxylic groups of the substrate to bond the silicon atom.

The amount of the ester copolymer (alkene-alkenyl alkanoate or alkene-alkyl alkenoate) or mixtures thereof is not required to be very large to provide the improved bonding; it may be larger than required for that purpose in order to provide other properties in accordance with the aforementioned prior art. In general, it is about 5–50% by weight of the composition. Furthermore, the improved wax bonding can be obtained without incorporating the silane compound in the entire wax coating. For example, a hot melt wax film containing both the ester and the silane substances can be applied to the surface of the substrate and then a hot melt wax film containing the same or a different concentration of the ester but no silane can be applied (fused) to the exposed surface of the bonded film. On the other hand, the silane, even when dispersed throughout the wax mass does not interfere with the other functions of the ester(s) until the ratio of the secondary amino groups to the ester groups present in the composition exceeds about 1:4.

The petroleum waxes

The petroleum waxes used in the compositions of the invention are referred to in the art as paraffin wax and as microcrystalline wax. Microcrystalline wax is also known as amorphous wax and is obtained by the dewaxing of residual lubricating oils, while the paraffin waxes are usually obtained by the dewaxing of distillate lubricating oil fractions. Distillate paraffin waxes usually have melting points between 120° F. and about 145° F., preferably between about 125 and 140° F. Microcrystalline waxes which contain only minor amounts of normal paraffins and largely predominate in highly branches paraffinic and naphthenic waxes have melting points in the order of 130–160° F., usually between 140 and 150° F. The higher melting point paraffin waxes are especially useful in many coating compositions: heavy distillate waxes obtained from the highest boiling distillate lubricating oil fractions by dewaxing have melting points in the order of 145 to 185° F., as does the high melting point paraffin wax split from microcrystalline wax by fractional distillation. Special waxes may be obtained in particular instances, such as the plastic wax obtained by the deoiling of soft wax fractions which normally are separated from paraffin waxes during deoiling and dewaxing procedures. These plastic waxes are useful for their extreme flexibility. It is normal experience in designing wax compositions to combine several waxes in a single composition, in order to obtain beneficial properties inherent in the particular type of wax.

PREFERRED EMBODIMENTS OF THE INVENTION

In order to demonstrate the effectiveness of the silane compounds of this invention as agents to promote and retain heat seal of wax blends, evaluations were made of two representative substrates and the results compared with the results obtained similarly using two other silane compounds.

The compounds were:

(A) N - (trimethoxysilylpropyl)ethylenediamine, with the formula $(CH_3O)_3Si(CH_2)_3NH(CH_2)_2NH_2$;

(B) N - (dimethoxymethylsilylisobutyl)ethylenediamine, with the formula $(CH_3O)_2Si(CH_3) \cdot CH_2CH(CH_3)CH_2NH(CH_2)_2NH_2$;

(C) Gamma - methacryloxypropyltrimethoxysilane with the formula $CH_2 \cdot C(CH_3) \cdot COO(CH_2)_3Si(OCH_3)_3$; and (D) Gamma-aminopropyltriethoxysilane, with the formula $NH_2CH_2CH_2CH_2Si(OCH_2CH_3)_3$.

The silanes A, B, C and D were evaluated in a blend of waxes SW200, SW300 and SM500 in a weight ratio of 30:10:30, respectively, containing 16% by weight of a high molecular weight ethylene-vinyl acetate copolymer of 27–29% wt. vinyl acetate content and a melt index of 5–7. The wax composition was applied as a hot molten film to the uncoated surface of "Mosscoat" food grade paperboard cart on stock. Typical properties of the waxes are given in Table I:

TABLE I

| | Wax | | |
|---|---|---|---|
| | SW200 | SW300 | SM500 |
| Properties:[1] | | | |
| M.P., °F | 141.6 D87 | 159.0 D87 | 141 D127 |
| Penetration at 77° F. D1321 | 10 | 13 | 21 |
| Penetration at 100° F. D1321 | 19 | 24 | 52 |
| Penetration at 110° F. D1321 | 45 | 33 | 125 |
| SU viscosity at 210° F. D88 | 40.5 | 50.5 | 79.5 |
| Oil content, percent wt. D721 | 0.1 | 0.7 | 0.9 |
| Tensile strength, p.s.i. D1320 | 355 | 305 | |

[1] The "D" designation refer to the ASTM method.

The results, both initial and after aging of the coated paper, at different silane concentrations are given in Table II:

TABLE II.—HOT SEAL COATING WITH PETROLEUM WAX COMPOSITION CONTAINING ETHYLENE-VINYL ACETATE COPOLYMER AND SILANE COMPOUND IN CERTAIN PROPORTIONS

| Silane compound | Seal | 3% wt. | 1% wt. | 0.1% wt. | 500 p.p.m. | 240 p.p.m. | 165 p.p.m. |
|---|---|---|---|---|---|---|---|
| A | Initial | NFT | NFT | FT | | FT | |
|   | Aged | | | SFT [d] | | SFT [d] | |
| B | Initial | FT | FT | FT | FT | FT | FT |
|   | Aged | NFT [a] | NFT [b] | FT [c] | FT [c] | FT [c] | FT [c] |
| C | Initial | | | NFT | NFT | | |
|   | Aged | | | | | | |
| D | Initial | | | NFT | NFT | | |
|   | Aged | | | | | | |

[a] 5 days.
[b] 9 days.
[c] 370 days.
[d] 24 days.

NOTE.—FT=Fiber tear of seal; NFT=No fiber tear of seal; SFT=Some fiber tear of seal The optional ethylene-propylene copolymer The ethylene-propylene copolymers described in U.S. 3,210,305 are particularly useful in the compositions of this invention to provide wax compositions of improved toughness, flexibility, tensile strength, elongation and resistance to cracking at low temperature. They preferably have an average molecular weight of 200,000–400,000 and an intrinsic viscosity of between about 1.0 and 6.0, preferably between about 2 and 5. Preferably, they contain 80–95 mol percent of ethylene units. The ethylene-propylene copolymer is used in amounts from zero to about 40% by weight, based on the total of petroleum wax and ethylene-propylene copolymer.

We claim as our invention:

1. A wax composition consisting essentially of petroleum wax, 5–50% by weight of a coplymer of ethylene and an unsubstituted terminally monoethylenically unsaturated ester of 4 to 8 carbon atoms comonomer selected from the group consisting of a vinyl alkanoate and an alkyl acrylate, the comonomer constituting 15 to 35% by weight of the copolymer, and from about 200 to about 2000 part per million by weight of an N-(di-1 to 2 carbon alkoxy 1 to 2 carbon alkylsilyl 2 to 4 carbon alkyl) 2 to 4 carbon alkylene diamine or an N-(tri-1 to 2 carbon alkoxysilyl 2 to 4 carbon alkyl) 2 to 4 carbon alkylene diamine.

2. A wax composition according to claim 1, wherein the copolymer is an ethylene-vinyl acetate copolymer.

3. A wax composition according to claim 1, wherein the copolymer is an ethylene-methyl acrylate copolymer.

4. A wax composition according to claim 1, wherein the diamine compound is N-(dimethoxymethylsilylisobutyl)ethylene diamine.

5. A wax composition according to claim 1, wherein the diamine compound is N-(trimethoxysilylpropyl)ethylene diamine.

6. A wax composition according to claim 2, wherein the diamine compound is N-(dimethoxymethylsilylisobutyl)ethylene diamine.

References Cited

UNITED STATES PATENTS 3,046,155    7/1962    Reinke.

MORRIS LIEBMAN, Primary Examiner

T. MORRIS, Assistant Examiner

U.S. Cl. X.R.

117—158